United States Patent
Seki et al.

(10) Patent No.: US 9,113,140 B2
(45) Date of Patent: Aug. 18, 2015

(54) STEREOSCOPIC IMAGE PROCESSING DEVICE AND METHOD FOR GENERATING INTERPOLATED FRAME WITH PARALLAX AND MOTION VECTOR

(71) Applicant: PANASONIC CORPORATION, Osaka (JP)

(72) Inventors: Yukinaga Seki, Kyoto (JP); Hidetoshi Takeda, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 364 days.

(21) Appl. No.: 13/656,071

(22) Filed: Oct. 19, 2012

(65) Prior Publication Data

US 2013/0050447 A1 Feb. 28, 2013

Related U.S. Application Data

(63) Continuation of application No. PCT/JP2012/002554, filed on Apr. 12, 2012.

(30) Foreign Application Priority Data

Aug. 25, 2011 (JP) ................................. 2011-183268

(51) Int. Cl.
*H04N 13/04* (2006.01)
*H04N 13/00* (2006.01)

(52) U.S. Cl.
CPC ........ *H04N 13/0011* (2013.01); *H04N 13/0438* (2013.01); *H04N 2013/0081* (2013.01); *H04N 2013/0085* (2013.01)

(58) Field of Classification Search
CPC .................................................. H04N 13/0011
USPC ............................................................ 348/51
See application file for complete search history.

(56) References Cited

U.S. PATENT DOCUMENTS

| | | | |
|---|---|---|---|
| 6,314,211 | B1 | 11/2001 | Kim et al. |
| 6,445,833 | B1 | 9/2002 | Murata et al. |
| 2009/0231314 | A1 | 9/2009 | Hanaoka et al. |
| 2009/0244269 | A1 | 10/2009 | Watanabe |

(Continued)

FOREIGN PATENT DOCUMENTS

| JP | 10-032841 | 2/1998 |
|---|---|---|
| JP | 11-275604 | 10/1999 |

(Continued)

OTHER PUBLICATIONS

International Search Report issued in International Patent Application No. PCT/JP2012/002554 dated Jun. 26, 2012.

*Primary Examiner* — Richard Torrente
(74) *Attorney, Agent, or Firm* — McDermott Will & Emery LLP

(57) ABSTRACT

A parallax detector detects a parallax between a left-eye image and a right-eye image of an input stereoscopic image signal. A vector detector detects an inter-frame motion vector in the stereoscopic image signal. An output controller determines whether or not to generate an interpolated frame based on the detected parallax and motion vector, and outputs a control signal indicating a result of the determination. An output image generator generates an interpolated frame having an interpolation phase using the motion vector when the control signal indicates that an interpolated frame is to be generated.

11 Claims, 11 Drawing Sheets

(56) References Cited

U.S. PATENT DOCUMENTS

| | | |
|---|---|---|
| 2010/0053306 A1 | 3/2010 | Hirasawa et al. |
| 2011/0007136 A1 | 1/2011 | Miura et al. |
| 2011/0063423 A1 | 3/2011 | Yamada et al. |
| 2011/0199457 A1 | 8/2011 | Yoshida et al. |
| 2012/0098942 A1* | 4/2012 | Meyer et al. ............ 348/51 |

FOREIGN PATENT DOCUMENTS

| | | |
|---|---|---|
| JP | 2009-239389 | 10/2009 |
| JP | 2010-062695 | 3/2010 |
| JP | 2010-278955 | 12/2010 |
| JP | 2011-103504 | 5/2011 |
| JP | 2011-114472 | 6/2011 |

* cited by examiner

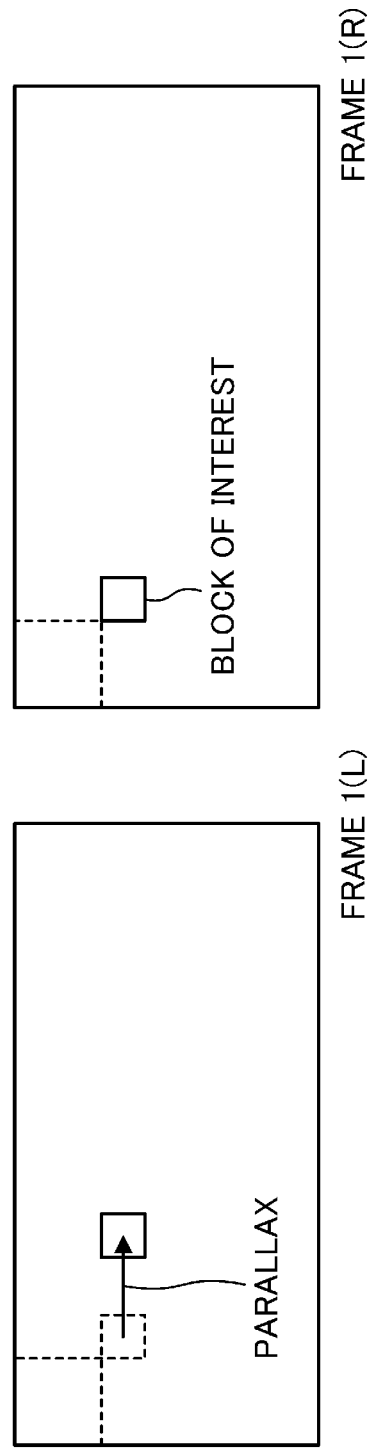

FIG.6A

PARALLAX POSSESSED BY IMAGES

|   | A | B | C |
|---|---|---|---|
| 1 | −5 | −10 | −15 |
| 2 | −20 | 25 | −30 |
| 3 | −35 | −35 | −35 |

FIG.6B

APPARENT PARALLAX

|   | A | B | C |
|---|---|---|---|
| 1 | −5 | −10 | −15 |
| 2 | −20 | −12 | −30 |
| 3 | −35 | −35 | −35 |

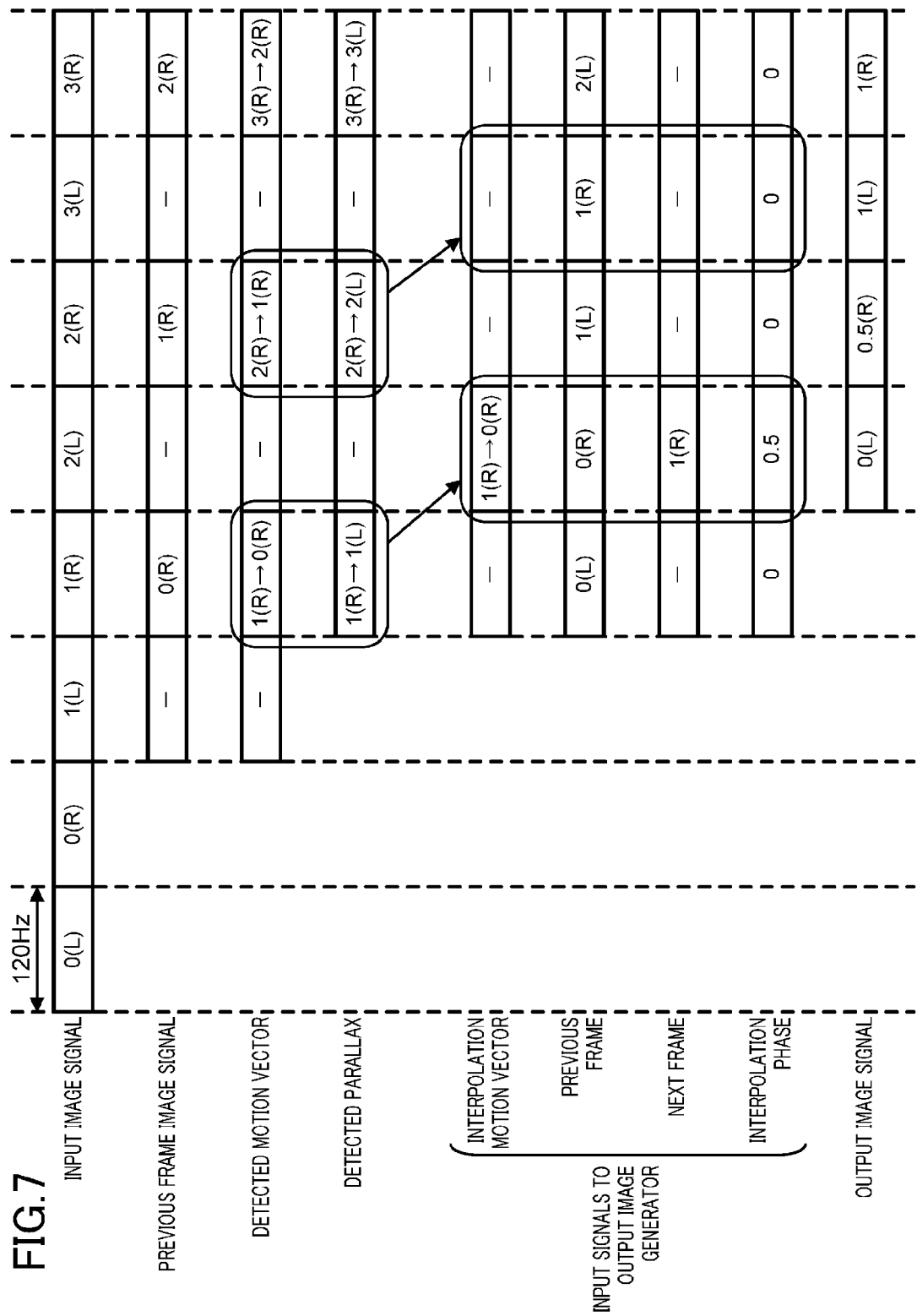

STEREOSCOPIC IMAGE PROCESSING DEVICE AND METHOD FOR GENERATING INTERPOLATED FRAME WITH PARALLAX AND MOTION VECTOR

CROSS-REFERENCE TO RELATED APPLICATIONS

This is a continuation of PCT International Application PCT/JP2012/002554 filed on Apr. 12, 2012, which claims priority to Japanese Patent Application No. 2011-183268 filed on Aug. 25, 2011. The disclosures of these applications including the specifications, the drawings, and the claims are hereby incorporated by reference in their entirety.

BACKGROUND

The present disclosure relates to stereoscopic image processing technology, and more particularly, to techniques of performing image processing for frame sequential display to alternately display left and right images of a stereoscopic image signal.

3D movies which present different images to the left and right eyes of a viewer, who in turn uses binocular parallax to have stereoscopic impression, have in recent years rapidly become popular. 3D movie theaters have been widespread, and also, 3D movies have been widely viewed in homes using 3D-enabled devices.

Stereoscopic images are typically viewed using liquid crystal shutter glasses in homes. A display device alternately displays left-eye images and right-eye images (frame sequential display), while a viewer wears liquid crystal shutter glasses which block images which would otherwise enter the left or right eye, in synchronization with display. As a result, the viewer perceives left-eye images only using the left eye and right-eye images only using the right eye, and therefore, can have stereoscopic impression due to a parallax between the left and right images.

FIG. 9 shows a scene that a ball moves across a screen. FIG. 10 shows a relationship between positions and times of the ball in images which have been captured at a rate of 60 Hz from each of the left and right points of view in a stereoscopic manner and are alternately displayed for the left and right eyes at a rate of 120 Hz in a frame sequential display scheme.

When stereoscopic images which have been obtained by simultaneously capturing left and right images are displayed in a frame sequential scheme, displayed left and right images are spaced in time by 1/120 sec. It is known that when a human views an object which is moving at an almost constant speed, his or her line of sight moves to follow the motion. FIG. 10 shows, by arrows, movement trajectories of the lines of sight which have followed the displayed ball.

Therefore, as shown in FIG. 11, when an image for one eye is displayed, the position of the line of sight of the other eye has been further shifted, depending on the movement of the ball. For example, when a right-eye image is displayed, the position of the line of sight of the left eye has been further shifted from the position of the ball in the immediately previous left-eye image by an amount corresponding to 0.5 frames. Specifically, when a scene obtained by capturing a horizontally moving ball in a stereoscopic manner is displayed in a frame sequential display scheme, the positions of the lines of sight of the left and right eyes are different from each other in the horizontal direction by an amount (0.5 frames) corresponding to the movement of the ball. The difference in the position in the horizontal direction of the line of sight between the left and right eyes has an influence on the stereoscopic impression of a stereoscopic image, so that the image is perceived as being closer to or further from the viewer than the actual position of the ball is.

Japanese Patent Publication No. 2010-62695 describes a technique of addressing the above problem with the frame sequential display, in which a motion vector is detected from an image signal, an interpolated frame is generated by shifting the phase of an image for one eye by 0.5 frames using the detected motion vector, and stereoscopic display is performed using the interpolated frame.

SUMMARY

The motion vector which is used to generate the interpolated frame is detected by comparing successive frames. Therefore, the movement of an object can be correctly detected, but motions such as rotation and enlargement/reduction, may not be able to be detected. A correct motion vector also cannot be detected in a region which is contained in only one of successive frames, such as a region which is hidden behind a moving object, a region which emerges from behind a moving object, a region around an object which is changing its shape, etc. Moreover, a motion vector is typically detected by searching a predetermined range which is set with reference to a block of interest. For a motion exceeding the search range, a correct motion vector may not be detected.

When a correct motion vector is thus not detected, noise called halo occurs around a moving object etc. in an interpolated frame and an image including successive interpolated frames.

When, as described in Japanese Patent Publication No. 2010-62695, the phases of images for one eye are invariably shifted from the phases of images for the other eye by an amount corresponding to 0.5 frames, base images which have not been converted are invariably displayed as one of left and right images while interpolated frames are invariably displayed as the other of left and right images. In this case, if a correct motion vector is not detected and therefore an error occurs in interpolation, left and right images may not correspond to each other, and therefore, may not enable the viewer to achieve stereopsis (i.e., stereoscopic impression), or the viewer may have stereoscopic impression with low quality.

In view of the above problem, it may be preferable that an interpolated frame be generated only when an image contains a motion which has an influence on stereoscopic impression of a stereoscopic image displayed in a frame sequential scheme, and a base image be used without generating an interpolated frame when there is not a motion which has a particular influence on stereoscopic impression. Such a control may be expected to further improve the display quality of stereoscopic images.

The present disclosure describes implementations of a stereoscopic image processing technique which further improves the display quality of stereoscopic images which are displayed in a frame sequential scheme.

An example stereoscopic image processing device of the present disclosure for generating an output image signal for frame sequential display based on an input stereoscopic image signal, includes a parallax detector configured to detect a parallax between a left-eye image and a right-eye image of the stereoscopic image signal, a vector detector configured to detect an inter-frame motion vector in at least either of the left-eye and right-eye images of the stereoscopic image signal, an output controller configured to determine whether or not to generate an interpolated frame based on the parallax detected by the parallax detector and the motion vector detected by the vector detector, and output a control signal indicating a result of the determination, an output image generator configured to receive the control signal, and generate an interpolated frame having an interpolation phase using the motion vector for at least either of the left-eye and right-eye images of the stereoscopic image signal when the control signal indicates that an interpolated frame is to be generated, and an output unit configured to arrange frames of the left-eye and right-eye images of the stereoscopic image signal alternately in time, and replace a frame corresponding to the interpolation phase with the interpolated frame generated by the output image generator.

An example stereoscopic image display device of the present disclosure includes the above example stereoscopic image processing device and a display unit configured to receive an output image signal from the stereoscopic image processing device and perform frame sequential display.

An example stereoscopic image processing method of the present disclosure for generating an output image signal for frame sequential display based on an input stereoscopic image signal, includes a parallax detection step of detecting a parallax between a left-eye image and a right-eye image of the stereoscopic image signal, a vector detection step of detecting an inter-frame motion vector in at least either of the left-eye and right-eye images of the stereoscopic image signal, an output control step of determining whether or not to generate an interpolated frame based on the detected parallax and the detected motion vector, an output image generation step of generating an interpolated frame having an interpolation phase using the motion vector for at least either of the left-eye and right-eye images of the stereoscopic image signal when it is determined that an interpolated frame is to be generated, and an output step of arranging frames of the left-eye and right-eye images of the stereoscopic image signal alternately in time, and replacing a frame corresponding to the interpolation phase with the generated interpolated frame.

In the above examples, an interpolated frame having an interpolation phase is generated using a motion vector for at least either of left-eye images and right-eye images of an input stereoscopic image signal. Note that it is determined whether or not an interpolated frame is to be generated, based on a parallax between a left-eye image and a right-eye image and a motion vector. As a result, if an image contains a motion which has an influence on stereoscopic impression of a stereoscopic image displayed in a frame sequential scheme, an interpolated frame is generated, and otherwise, a base frame is used. Therefore, it is possible to reduce the possibility that a correct motion vector cannot be detected, so that an appropriate interpolated frame is not generated, and therefore, the display quality of a stereoscopic image is reduced. As a result, the display quality of a stereoscopic image can be further improved.

According to the present disclosure, a degradation in image quality due to an error in interpolation can be reduced while high-quality stereoscopic display can be achieved.

BRIEF DESCRIPTION OF THE DRAWINGS

FIG. 5 is a diagram for describing parallax detection.

FIGS. 6A and 6B are diagrams showing an example relationship between parallaxes and apparent parallaxes which are possessed by images.

FIG. 7 is a diagram showing a timing of generation of an interpolated frame using parallax information in the embodiment.

DETAILED DESCRIPTION

Embodiments are described in detail below with reference to the attached drawings. However, unnecessarily detailed description may be omitted. For example, detailed description of well-known techniques or description of the substantially same elements may be omitted. Such omission is intended to prevent the following description from being unnecessarily redundant and to help those skilled in the art easily understand it.

Inventors provide the following description and the attached drawings to enable those skilled in the art to fully understand the present disclosure. Thus, the description and the drawings are not intended to limit the scope of the subject matter defined in the claims.

Figure 1:
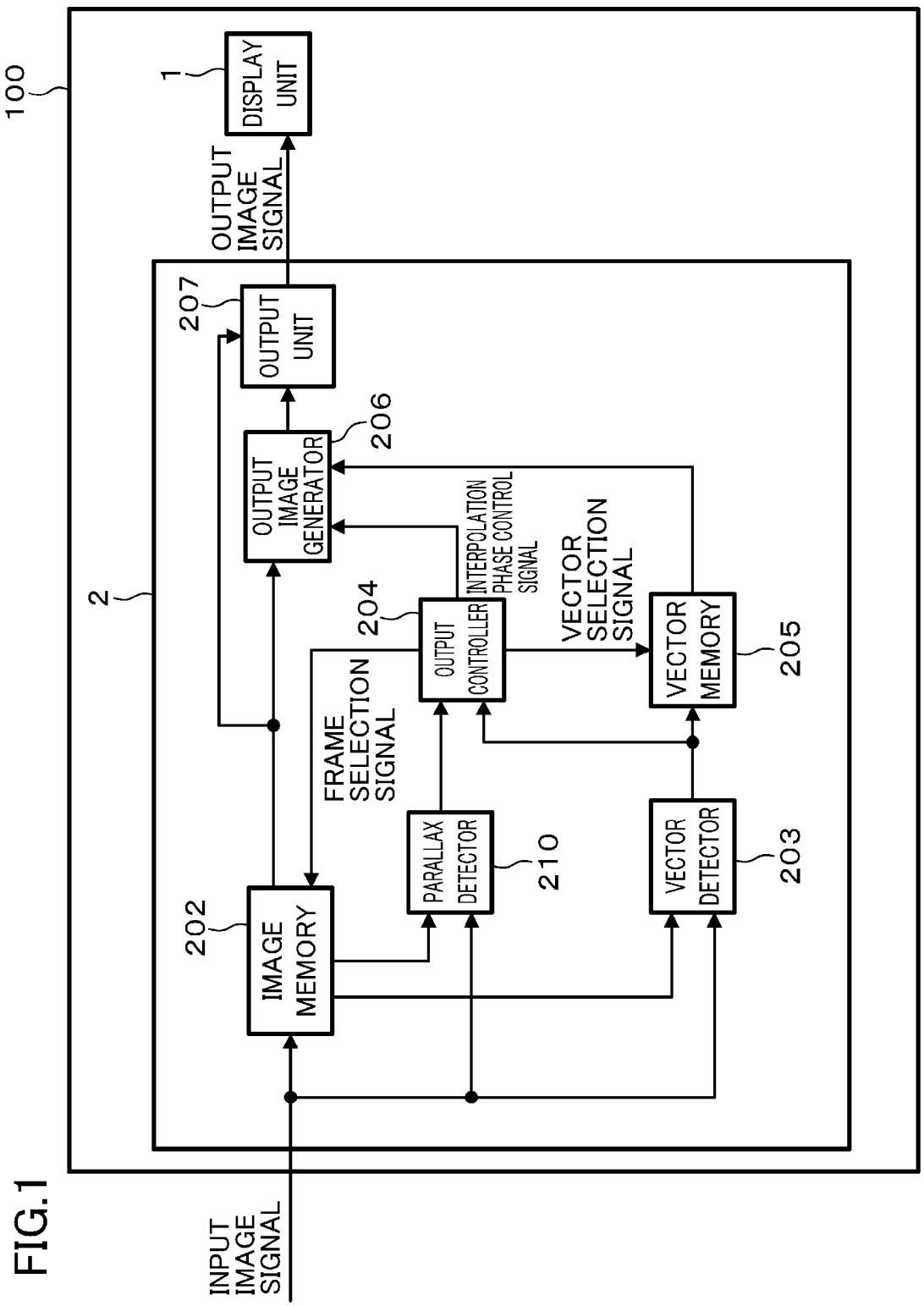
FIG. 1 is a diagram showing a functional configuration of a stereoscopic image display device according to an embodiment.

FIG. 1 is a block diagram showing a main configuration of a stereoscopic image display device 100 according to an embodiment. The stereoscopic image display device 100 includes a display unit 1, and a stereoscopic image processing device 2 which generates, based on an input stereoscopic image signal, an output image signal for frame sequential display.

Here, the stereoscopic image signal input to the stereoscopic image processing device 2 is assumed to be a 120-Hz stereoscopic image signal in which left and right images are alternately placed on the time axis with the sets of left and right images each having a frame frequency of 60 Hz. The stereoscopic image processing device 2 detects an inter-frame motion vector in at least either of left-eye images and right-eye images of the input stereoscopic image signal, and generates an interpolated frame using the motion vector. Thereafter, the stereoscopic image processing device 2 replaces base frames with the generated interpolated frames, and alternately places the left-eye image and the right-eye images on the time axis, thereby generating an output image signal which is to be output to the display unit 1.

The display unit 1 displays the output image signal from the stereoscopic image processing device 2, for example, at 120 Hz in a frame sequential scheme. The display unit 1 may be any device that can display the stereoscopic image signal, such as a liquid crystal display (LCD), a plasma display (PDP), etc., and is not particularly limited.

The stereoscopic image processing device 2 includes an image memory 202, a vector detector 203 which detects a motion vector, an output controller 204 which controls generation of an interpolated frame, a vector memory 205, an output image generator 206 which generates an interpolated frame, an output unit 207, and a parallax detector 210 which detects a parallax between left and right images.

Here, the configuration and operation of the stereoscopic image processing device 2 will be described using an example in which the stereoscopic image processing device 2 generates an interpolated frame by shifting the phase of a right-eye image of an input stereoscopic image signal by an amount corresponding to 0.5 frames and generates an output image signal using the interpolated frame. Specifically, in this embodiment, base images are used for left-eye images while interpolated images obtained using motion vectors are used for right-eye images. Note that the present disclosure is not limited to this, and for example, base images may be used for right-eye images while interpolated images may be used for left-eye images.

An image signal input to the stereoscopic image processing device 2 is input to the image memory 202, the vector detector 203, and the parallax detector 210. Here, firstly, generation of an interpolated frame without using information about parallax will be described. Operation of the parallax detector 210 and generation of an interpolated frame using parallax information will be described below.

The image memory 202 can store at least three frames of an input image signal, any of which can be read out. Here, the image memory 202 stores current left and right images and the immediately previous right-eye image, and outputs the immediately previous right-eye image to the vector detector 203.

The vector detector 203 does not operate when the input image signal is a left-eye image. On the other hand, when the input image signal is a right-eye image, the vector detector 203 divides the right-eye image into blocks each including, for example, 8 pixels×8 pixels, and for each block of the right-eye image, searches blocks obtained by similarly dividing the immediately previous right-eye image input from the image memory 202 for a block having a highest correlation with that block, thereby detecting a motion vector.

Figure 2:
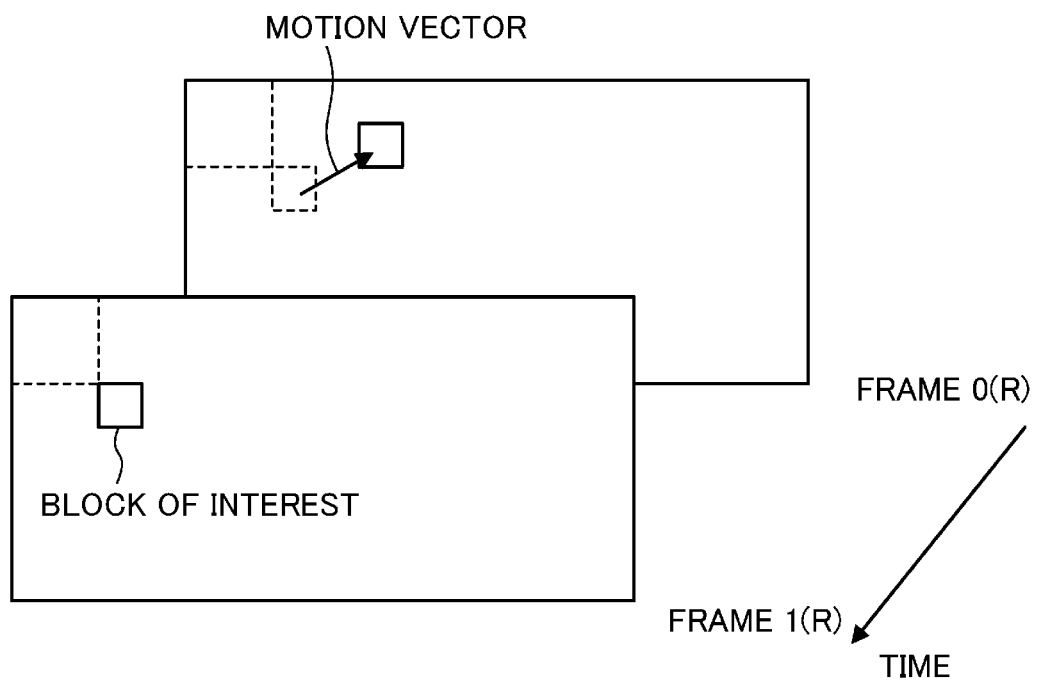
FIG. 2 is a diagram for describing motion vector detection.

For example, as shown in FIG. 2, a motion vector of a block of interest in a frame 1(R) which is the first frame of a right-eye image is detected as follows. A frame 0(R) which is the zeroth frame of a right-eye image immediately previous to the first frame is searched for a block which has a highest correlation with the block of interest. A difference in position between the block of interest and the found block is detected as a motion vector. The search process is performed within a range of, for example, ±64 pixels in the horizontal direction and ±32 lines in the vertical direction, which is set with reference to the block of interest for which a motion vector is to be detected. The position of a block having a highest correlation of all blocks within the range is calculated. As an index for correlation between two blocks which are compared, for example, the sum of absolute differences (SAD) between values of pixels contained in one block and values of corresponding pixels contained in the other block, may be used.

Note that the size of a block is not limited to the above example, and may be smaller or larger. In addition to SAD, other indices for correlation may be used. Many search techniques for efficiently detecting a motion vector while reducing the amount of data to be processed are known and may be employed.

Referring back to FIG. 1, the vector detector 203 outputs, to the vector memory 205, a motion vector which is detected from an input image signal and another input image signal which has been input before that input image signal.

The vector memory 205 stores motion vectors detected by the vector detector 203, and absorbs a time difference between write operation by the vector detector 203 and read operation (described below) by the output image generator 206. The vector memory 205 may have a capacity corresponding to the time difference. Here, the vector memory 205 is assumed to have a capacity to store vectors corresponding to two frames of input images.

The output controller 204 controls generation of an interpolated frame. Specifically, the output controller 204 determines:

(1) which motion vector stored in the vector memory 205 is to be read out;

(2) which two frames stored in the image memory 202 are to be read out; and (3) at which interpolation phase between two frames an interpolated frame is to be generated, and outputs a control signal in accordance with each determination. Specifically, the output controller 204 outputs a vector selection signal to the vector memory 205 in accordance with the determination of (1), a frame selection signal to the image memory 202 in accordance with the determination of (2), and an interpolation phase control signal to the output image generator 206 in accordance with the determination of (3). Detailed operation of the output controller 204 will be described below.

The image memory 202 receives, from the output controller 204, the frame selection signal which is used to select two frames for interpolation, and outputs the two frames specified by the frame selection signal, as a previous and next frame image signal, to the output image generator 206.

The vector memory 205 receives, from the output controller 204, the vector selection signal which is used to select a motion vector for interpolation, and outputs the motion vector specified by the vector selection signal, as an interpolation motion vector, to the output image generator 206.

Figure 3:
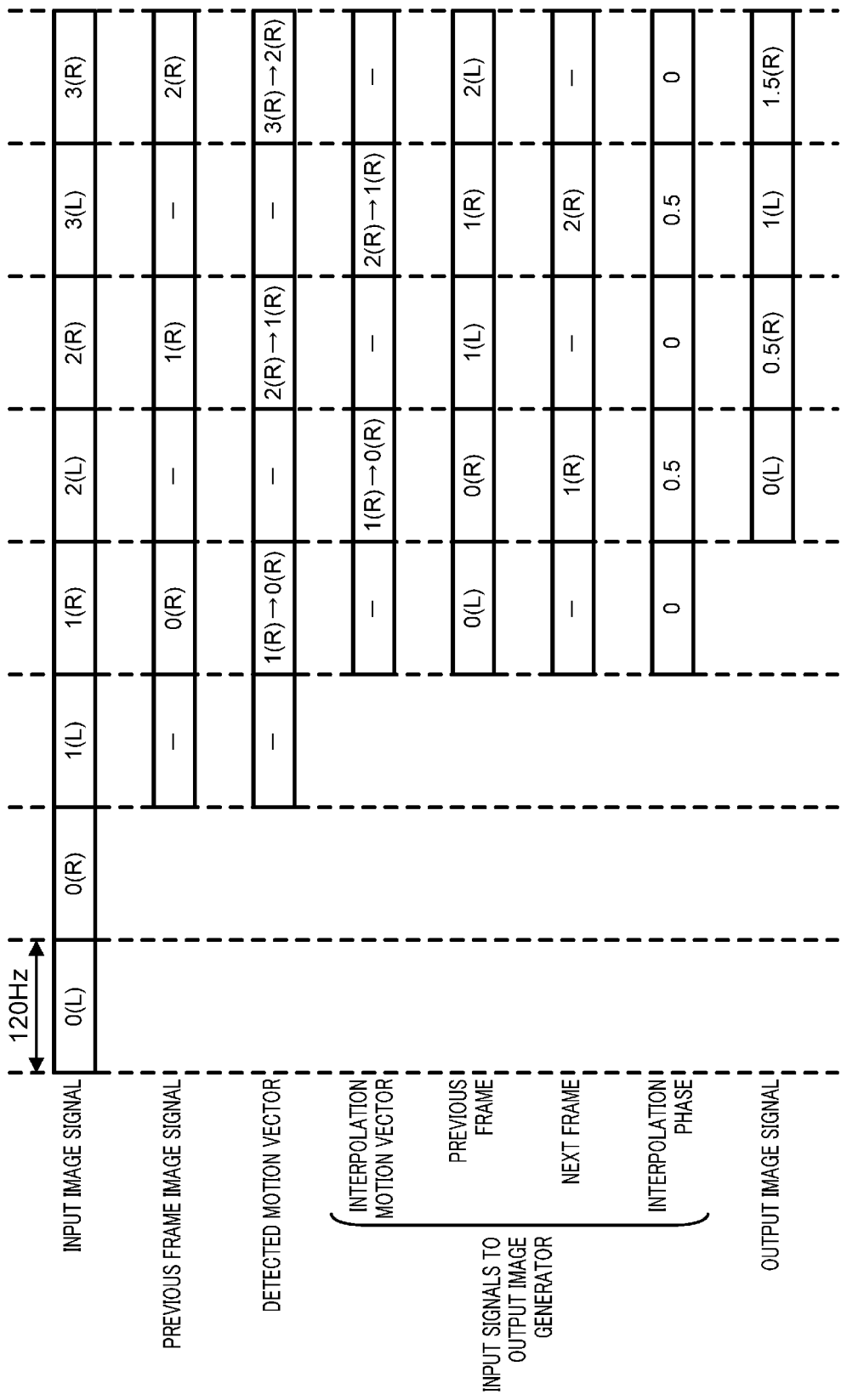
FIG. 3 is a diagram showing timings at which interpolated frames are generated, where parallax information is not used.

FIG. 3 is a diagram showing timings at which interpolated frames are generated, where parallax information is not used. For left images, interpolation is not performed and input frames are directly output. On the other hand, for right images, interpolated images generated by interpolation are output.

The motion vector detection is performed at the same frequency (60 Hz) as that of the input image signal. If the input image signal is of a left-eye image, the vector detection process is not performed. On the other hand, if the input image signal is of a right-eye image, the vector detection process is performed. When the frame 1(R) is input as the input image signal, a motion vector which is calculated from the frame 1(R) and the frame 0(R) which is input as the previous frame image signal is written to the vector memory 205. Thereafter, similarly, motion vectors each detected between one right-eye image frame and another right-eye image frame immediately previous thereto are written to the vector memory 205.

The interpolated frame generation is also performed at the same frequency (60 Hz) as that of the output image signal. Therefore, each control signal from the output controller 204 is output at a frequency of 60 Hz. The output controller 204 appropriately selects an input frame and an interpolation motion vector which are required for generation of an interpolated frame, and outputs a control signal (i.e., a frame selection signal and a vector selection signal) which is used to input the input frame and the interpolation motion vector to the output image generator 206, to the image memory 202 and the vector memory 205, respectively. In addition, the output controller 204 outputs an interpolation phase control signal to the output image generator 206.

For example, as shown in FIG. 3, initially, the frame 0(L) which is the zeroth frame of a left-eye image is directly output without performing interpolation. Therefore, the output controller 204 does not output a vector selection signal, outputs a frame selection signal for selecting the frame 0(L) as the previous frame, and outputs an interpolation phase control signal whose value is "0."

On the other hand, the interpolation phase of an interpolated frame generated is 0.5 with respect to the frames 0(R) and 1(R). Therefore, the output controller 204 outputs:

(1) a vector selection signal which is used to select a motion vector detected between the frames 1(R) and 0(R) as an interpolation motion vector, to the vector memory 205;

(2) a frame selection signal which is used to select the frame 0(R) and 1(R) as a previous and next frame image signal, to the image memory 202; and (3) a value of "0.5" as an interpolation phase control signal to the output image generator 206.

The output image generator 206 uses two frames input as the previous and next frame image signal from the image memory 202, and an interpolation motion vector corresponding to a motion between the two frames which is input from the vector memory 205, to generate an interpolated frame having an interpolation phase specified by the interpolation phase control signal.

Figure 4:
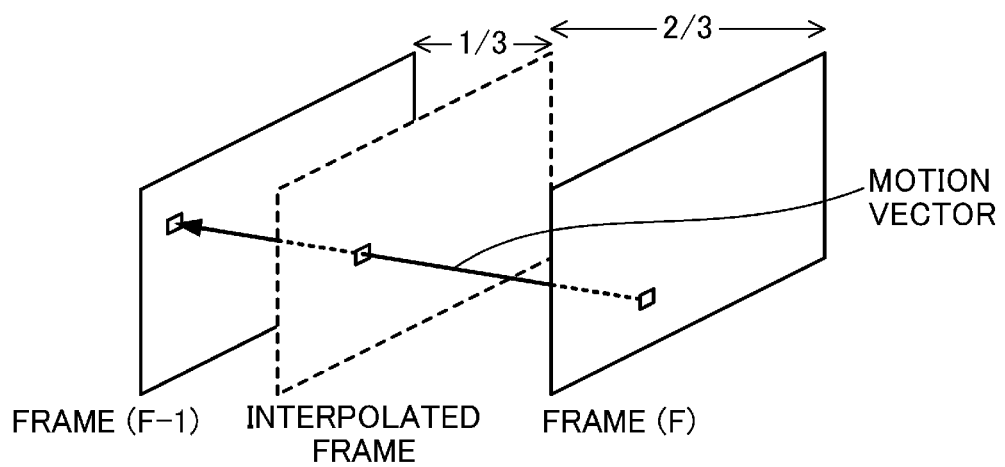
FIG. 4 is a diagram for describing interpolated frame generation.

As shown in FIG. 4, the interpolated frame can be generated by moving, along the interpolation motion vector, a pixel or a pixel block in at least one of frames previous and next to the interpolated frame to be generated. In this case, a position (i.e., an interpolation phase) on the time axis where the interpolated frame is generated can be arbitrarily selected between a frame (F−1) and a frame (F). Specifically, the interpolated frame may be generated using pixels shifted from one of the frames, such as only the frame closer to the interpolation phase, etc. Alternatively, the interpolated frame may be generated by mixing pixels shifted from both of the frames at a predetermined ratio or a ratio corresponding to the interpolation phase. FIG. 4 shows an example in which the interpolated frame is generated at an interpolation phase which is positioned at ⅓ of the distance between the frames (F−1) and (F), from the frame (F−1). Note that, in this embodiment, the interpolation phase is expressed by a value of zero or more and one or less. If the interpolation phase is zero, the interpolation phase indicates a position on the time axis of the frame (F−1). If the interpolation phase is one, the interpolation phase indicates a position on the time axis of the frame (F). If the interpolation phase is 0.5, the interpolation phase indicates a middle point on the time axis between the frames (F−1) and (F).

The output unit 207 performs a control so that frames of left-eye and right-eye images of a stereoscopic image signal are alternately arranged for frame sequential display. When the output image generator 206 generates an interpolated frame, the output unit 207 also performs a control so that a portion of the stereoscopic image signal on which the arrangement control has been performed is replaced with the interpolated frame. In this case, an image which is to be replaced is an image corresponding to the interpolation phase of the interpolated frame generated by the output image generator 206. Note that when an interpolated frame has not been generated, the output unit 207 does not perform the frame replacement process. The output unit 207 outputs the thus-arranged frames sequentially to the display unit 1.

Thereafter, by repeatedly performing such a process, an output image signal is generated.

With the above method, in the output image signal for frame sequential display, the phases of right-eye images are invariably shifted by an amount corresponding to 0.5 frames from the phases of right-eye images in the input image signal. In this case, images having phases corresponding to positions on the time axis are displayed in frame sequential display, and therefore, even when a motion is present in the images, an unnatural stereoscopic image does not occur. However, for example, if a correct motion vector has not been detected, an error occurs in interpolation, and therefore, a correct interpolated frame cannot be generated, likely leading to a significant degradation in image quality.

Therefore, in this embodiment, the parallax detector 210 is provided in the stereoscopic image processing device 2 to detect a parallax between left and right images of an input stereoscopic image signal. The output controller 204 determines whether or not to generate an interpolated frame, based on the parallax detected by the parallax detector 210 and the motion vector detected by the vector detector 203. If the output controller 204 determines not to generate an interpolated frame, the output controller 204 outputs "0" as an interpolation phase control signal.

As in the above motion vector calculation, the parallax detector 210 divides a right-eye image, for example, into blocks of 8 pixels×8 pixels, and for each of the blocks, searches a left-eye image for a block which has a highest correlation with that block, to detect a parallax. For example, in FIG. 5, for a block of interest in the frame 1(R), a block which has a highest correlation with the block of interest is searched for in a frame 1(L) which is the first frame of a left-eye image, and a difference between the positions of the blocks is detected as a parallax. Note that a parallax typically occurs in the horizontal (lateral) direction, and therefore, if search is performed in the horizontal direction with reference to the position of a block of interest, a corresponding block can be found.

The output controller 204 calculates the value of an "apparent parallax" based on a motion vector which has been detected on a block-by-block basis by the vector detector 203 and a parallax which has been detected on a block-by-block basis by the parallax detector 210. For example, the "apparent parallax" is calculated by:

$$(\text{apparent parallax}) = (\text{parallax}) - (\text{horizontal component of motion vector})/2$$

In other words, the "apparent parallax" means a parallax which has been affected by a motion vector (particularly, the horizontal component of the motion vector) which occurs due to a motion of an object on the screen. Still in other words, the "apparent parallax" means a parallax which is perceived by an image viewer who is affected by a motion of an object. A reason why there is a difference between the actual parallax and apparent parallax of left and right images is that the left and right images of a stereoscopic image which have been simultaneously captured are displayed alternately in time, i.e., the images are handled in different manners during capturing and displaying.

Although the "apparent parallax" is calculated using the above expression in this embodiment for the sake of simplicity, the present disclosure is not limited to this. The "apparent parallax" may be calculated in other manners. Specifically, any technique of calculating the "apparent parallax" which is actually viewed by a viewer who is affected by a motion of an object instead of an actual parallax of left and right images, may be used.

The output controller 204 divides a frame image into regions, and calculates a parallax and a motion vector for each region. The parallax and motion vector in each region can be calculated using an average, a median, etc. of the parallaxes and motion vectors of blocks in the region. A frame image may be divided into regions having a predetermined length and width, or may be divided on an object-by-object basis by a graph cut technique etc.

Thereafter, for each region, an "apparent parallax" is calculated based on a parallax and a motion vector. Thereafter, by comparing the "apparent parallaxes" of the regions, it is determined whether or not an interpolated frame is to be generated. Here, it is assumed that it is determined whether or not the relationship in the magnitude of an "apparent parallax" between regions is opposite to the relationship in the magnitude of a parallax between the regions. For example, the determination may be performed between one region and another region adjacent thereto, or between one region and all other regions in a frame. If the relationship in the magnitude of an "apparent parallax" between regions is opposite to the relationship in the magnitude of a parallax between the regions, then when the stereoscopic image is viewed, the relationship in depth between objects which are perceived is opposite to the actual relationship. Therefore, such an image is recognized as an unnatural image by the viewer. In other words, such an image has low quality for a stereoscopic image.

FIGS. 6A and 6B are diagrams showing an example relationship between parallaxes and "apparent parallaxes" of images. FIG. 6A shows the parallaxes of the images, and FIG. 6B shows the "apparent parallaxes" of the images. In FIGS. 6A and 6B, a parallax in each region is expressed in numbers. As the numerical value decreases, an object appears to be closer to the viewer. In other words, as the numerical value increases, an object appears to be further away (in the depth direction) from the viewer.

In FIG. 6A, only a center region B2 has a positive value of "25" while the other regions have negative values. On the other hand, in FIG. 6B showing the "apparent parallaxes," only the region B2 has a value of "−12" which is different from that of FIG. 6A while the other regions have the same values as those of FIG. 6A. In this case, the relationship in magnitude between the value of the region B2 and the values of the surrounding regions differs between FIGS. 6A and 6B. Specifically, in FIG. 6A, the value of "25" in the region B2 is greater than a value of "−5" in a region A1 or a value of "−10" in a region B1. However, in FIG. 6B, the value of "−12" in the region B2 is smaller than the value of "−5" in the region A1 or the value of "−10" in the region B1. Thus, FIGS. 6A and 6B show an example in which the relationship in the magnitude of an "apparent parallax" between regions is opposite to the relationship in the magnitude of a parallax between the regions.

In FIGS. 6A and 6B, in the region B2, an object which should appear to be located deeper than the screen because the actual parallax has a value of "25" actually appears to be closer to the viewer than the screen is because the "apparent parallax" has a value of "−12." In this case, the object in the region B2 which should appear to be located deeper than objects in the regions A1 and B1 appears to be closer to the viewer, i.e., the relationship in depth between objects is incorrect, resulting in an unnatural stereoscopic image. In other words, the reversal of the relationships in magnitude of a parallax and an "apparent parallax" means that impression of a depth of an object expressed by a parallax of left and right images of an input stereoscopic image signal differs from that of the original stereoscopic image signal when the image is actually displayed.

Therefore, the output controller 204 outputs "0.5" as an interpolation phase control signal when determining that the relationship in the magnitude of an "apparent parallax" between regions is opposite to the relationship in the magnitude of a parallax between the regions. For example, in the case of FIGS. 6A and 6B, the relationship in the magnitude of a parallax between the region B2 (first region) and the regions A1 and B1 (second regions) is different from the relationship in the magnitude of an "apparent parallax" between those regions, and therefore, the output controller 204 determines to generate an interpolated frame. On the other hand, when determining that the relationship in the magnitude of an "apparent parallax" is not opposite to the relationship in the magnitude of a parallax, the output controller 204 outputs "0" as an interpolation phase control signal. In this case, an interpolated frame does not need to be generated, and therefore, the output controller 204 does not allow the vector memory 205 to output an interpolation motion vector. Note that the interpolation phase of "0.5" means substantially a middle position in time, where the phase of the previous image in time is zero and the phase of the next image in time is one. In other words, in this case, the interpolation phase is located at substantially a middle position between the previous and next images in time.

Although, in this embodiment, for the sake of simplicity, it is determined whether or not an interpolated frame is to be generated, based on the relationship in the magnitude of a parallax between regions and the relationship in the magnitude of an "apparent parallax" between the regions, the present disclosure is not limited to this. A reason why the relationship in magnitude between regions is used is that such a relationship serves as a criterion for determining that objects in an image appear to have different impressions of relative depth. Other indices or criteria for measuring a change in depth information may be used to determine whether or not an interpolated frame is to be generated.

Even if the relationship in the magnitude of an "apparent parallax" between regions is opposite to the relationship in the magnitude of an actual parallax of images between the regions, the size of the regions (hereinafter referred to as "unnatural regions") is very small with respect to the entire image, it is considered that the viewer is unlikely to feel unnaturalness very much, and therefore, an interpolated frame does not necessarily need to be generated. In other words, the size of unnatural regions may be used as a criterion for determining whether or not an interpolated frame is to be generated. In this case, regions in which the relationship in the magnitude of an "apparent parallax" is not opposite to the relationship in the magnitude of a parallax, but the difference in "apparent parallax" between the regions is small (close to zero), may be defined as unnatural regions.

Similarly, the position of unnatural regions in an image (e.g., a position in the vicinity of the center, a position in the vicinity of an end portion, etc.) may be used as a factor for determination. For example, if unnatural regions are located at a position in the vicinity of the center of an image which has a relatively large influence, an interpolated frame may be positively generated.

In other words, it may be determined whether or not an interpolated frame is to be generated, in various manners, based on a parallax of an input stereoscopic image and an "apparent parallax" of a stereoscopic image to be displayed.

FIG. 7 is a diagram showing a timing of generation of an interpolated frame using parallax information in this embodiment. In the example of FIG. 7, a difference occurs in terms of parallax and "apparent parallax" between the frames 0(R) and 1(R) due to a motion of an image, and therefore, unnatural regions are detected, so that an interpolated frame 0.5(R) is generated. On the other hand, unnatural regions are not detected between the frames 1(R) and 2(R), and therefore, an interpolated frame is not generated, so that the original frame 1(R) is output. Other operation is similar to that of FIG. 3.

Thus, if an interpolated frame is generated, for example, when the relationship in the magnitude of an "apparent parallax" between regions is opposite to the relationship in the magnitude of a parallax between the regions, then when a stereoscopic image including left and right images simultaneously captured is displayed in a frame sequential scheme, images more suitable for the time axis of frame sequential display can be displayed. As a result, a stereoscopic image which is more natural than in the conventional art can be displayed.

Note that an input stereoscopic image does not need to include left and right images which have been simultaneously captured. Alternatively, a stereoscopic image may include left and right images which have been captured at different timings. Images are not limited to captured images and may be artificially created images, such as animation, CG, etc.

In the stereoscopic image processing technique of this embodiment, if an object in a stereoscopic image has a motion, and the relationship in depth between displayed objects is likely to be opposite to that in a base image (e.g., the relationship in the magnitude of an "apparent parallax" between regions is opposite to the relationship in the magnitude of a parallax between the regions), an interpolated frame having an interpolation phase corresponding to a difference in display timing is generated. As a result, a stereoscopic image which provides a correct stereoscopic effect can be displayed.

If the relationship in depth between objects in an image is correctly maintained, an interpolated frame is not generated, and therefore, a degradation in image quality due to an error in interpolation can be reduced. As described above, according to the stereoscopic image processing device and the stereoscopic image processing method described herein, a degradation in image quality due to an error in interpolation can be reduced while high-quality stereoscopic display can be achieved, compared to the conventional art.

Figure 8:
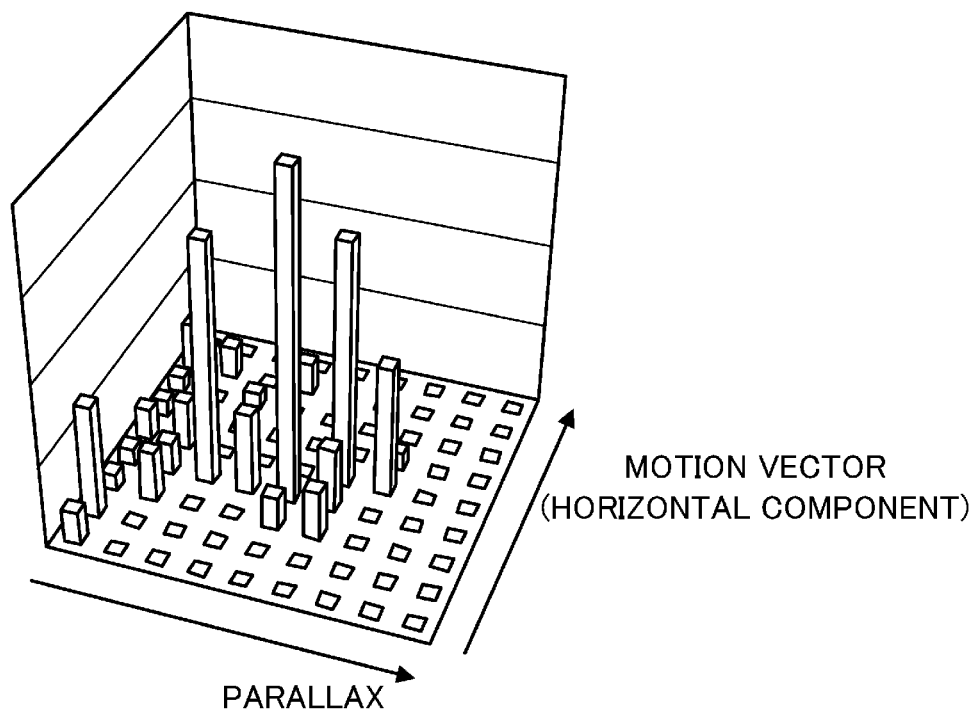
FIG. 8 is a histogram in which parallaxes and motion vectors are divided into classes, and the frequency is the number of blocks.
Figure 9:
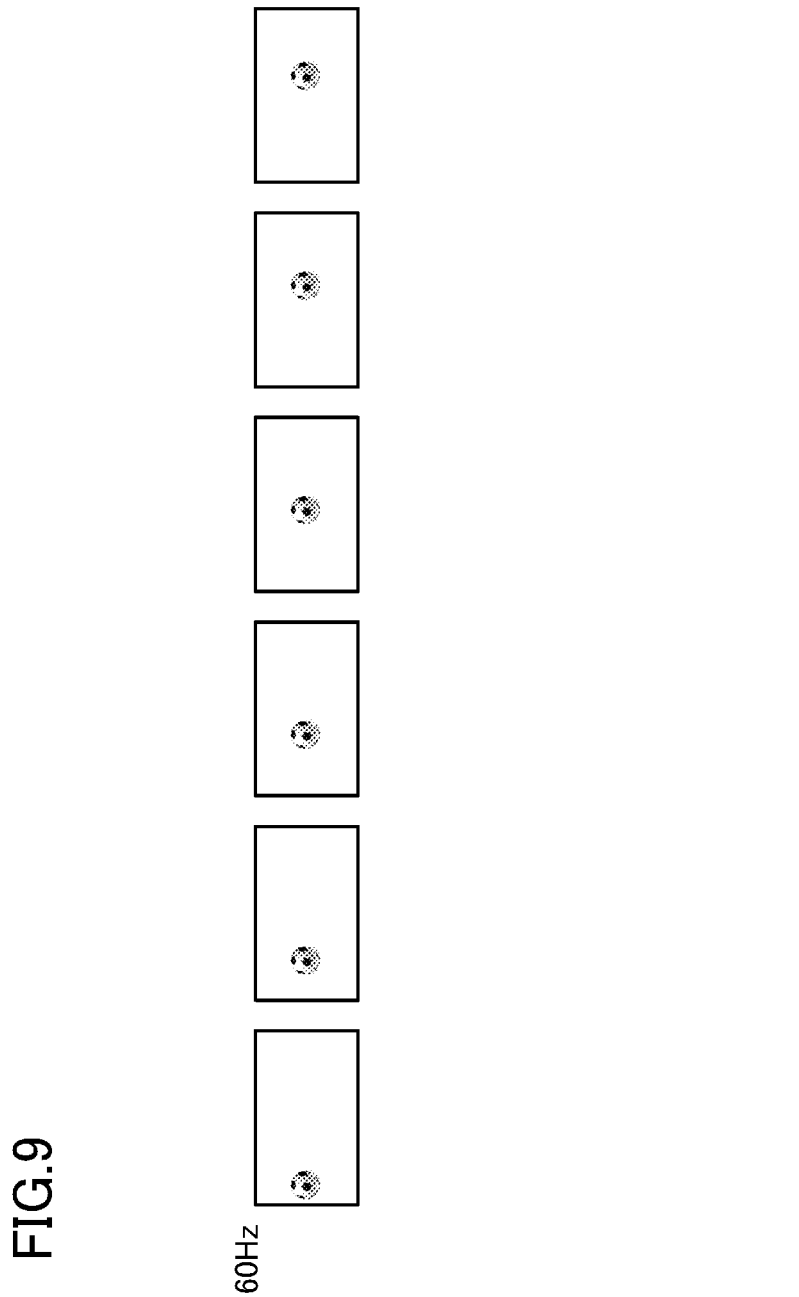
FIG. 9 is a diagram showing a motion of an object in a captured image.
Figure 10:
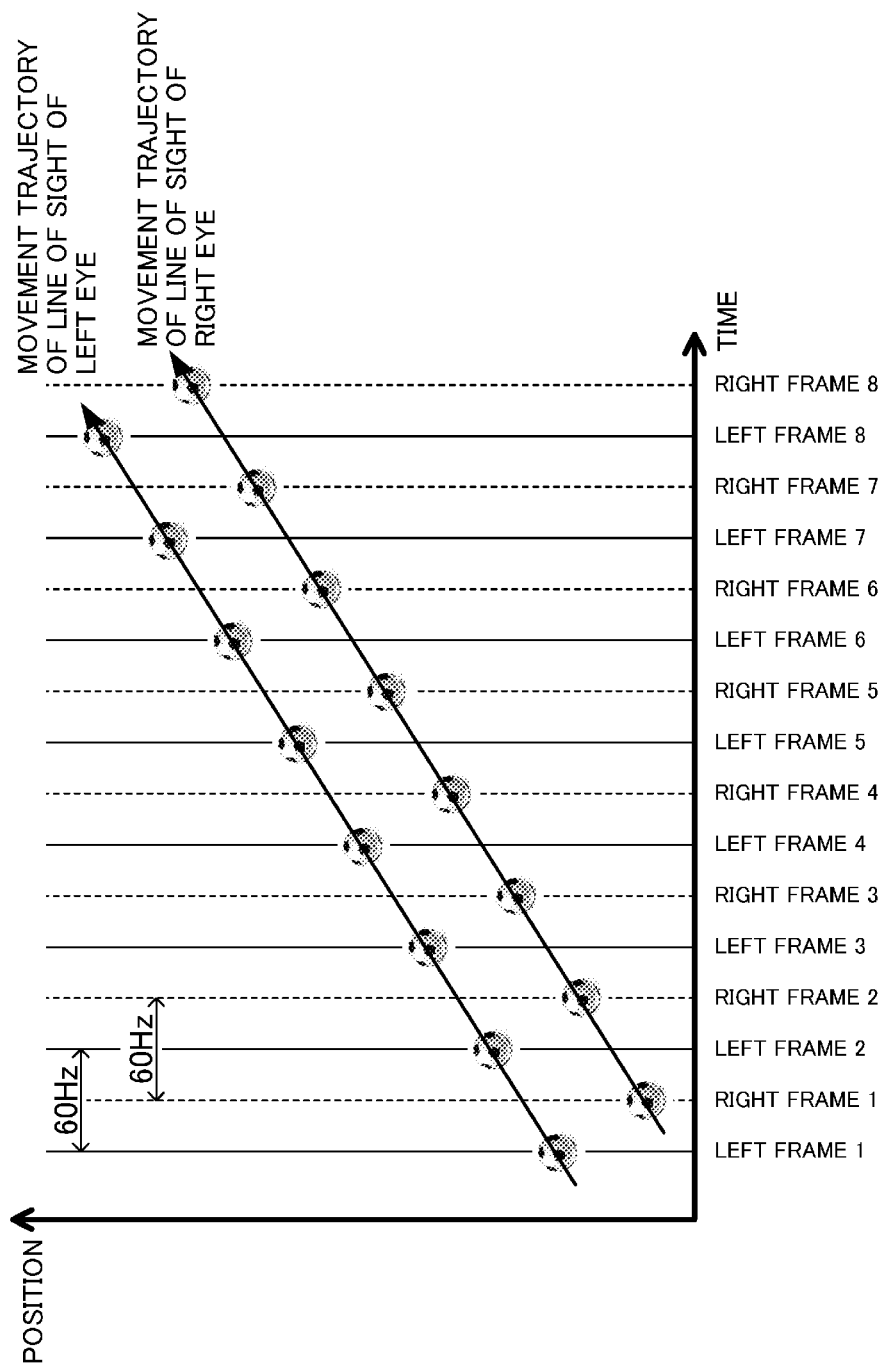
FIG. 10 is a diagram showing how a stereoscopic image displayed in a frame sequential scheme is viewed.
Figure 11:
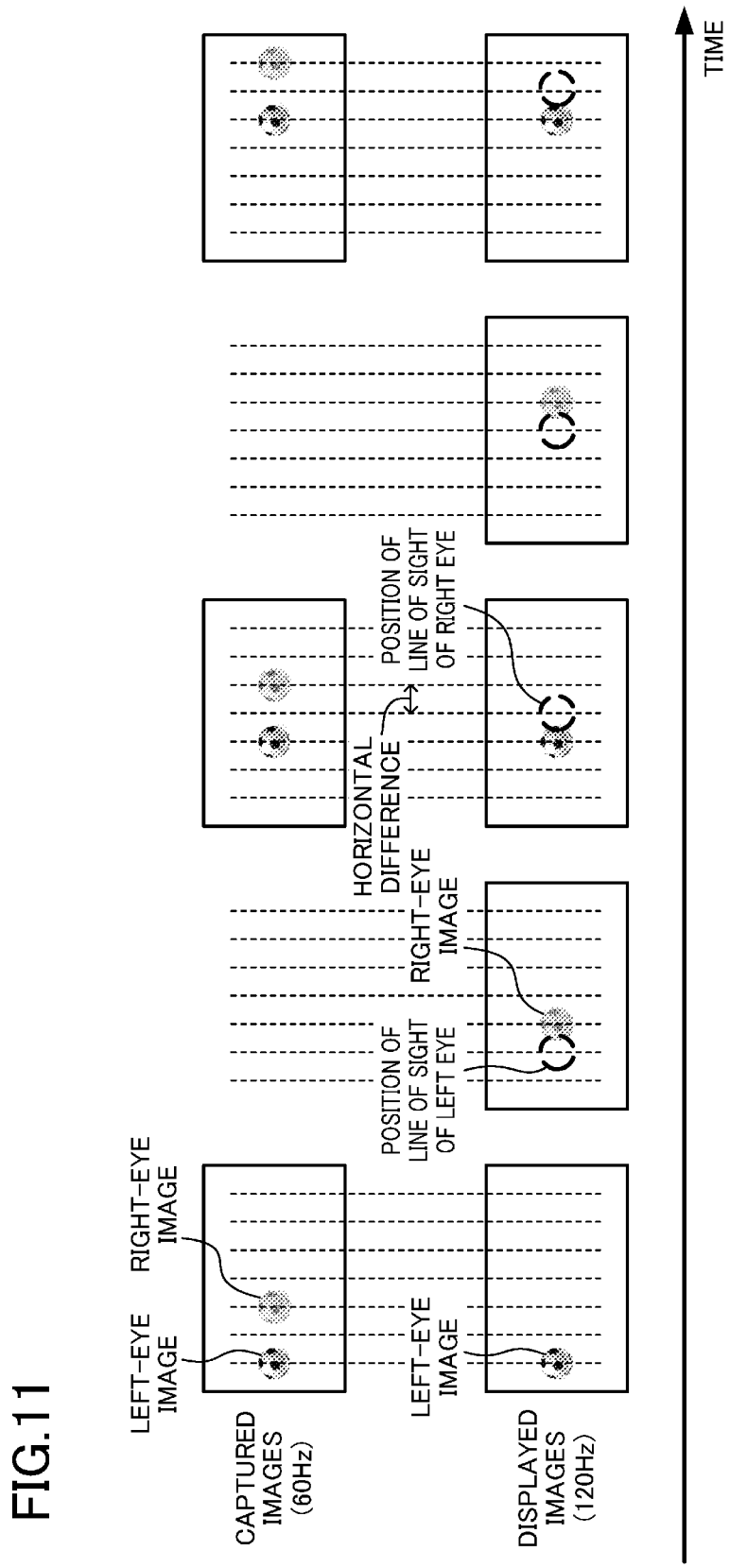
FIG. 11 is a diagram how a stereoscopic image is viewed when a scene including a horizontal motion is displayed in a frame sequential scheme.

Although, in this embodiment, it is determined whether or not an interpolated frame is to be generated, based on whether or not the relationship in the magnitude of an "apparent parallax" between regions is opposite to the relationship in the magnitude of a parallax between the regions, the present disclosure is not limited to this. For example, as shown in FIG. 8, the horizontal components of parallaxes and motion vectors are divided into classes. A histogram is produced in which the frequency is the number of blocks in a frame belonging to each class. Based on the histogram, it may be determined whether or not an interpolated frame is to be generated. For example, in classes which have a frequency greater than or equal to a predetermined value, the values of a parallax and a motion vector representative of the class are used to calculate an "apparent parallax." Thereafter, it is determined whether or not the relationship in the magnitude of an "apparent parallax" between the classes having a greater frequency is opposite to the relationship in the magnitude of a parallax between the classes. When the determination result is positive, it is determined that an interpolated frame is to be generated.

Although, in this embodiment, it is determined whether or not interpolation is to be performed, on a frame-by-frame basis, it may be determined whether or not an interpolated image is to be generated, for each image region in an interpolated frame. In this case, the size of each image region may be the same as or different from that of each block used in motion vector detection. For example, if the relationships in magnitude of a parallax and an "apparent parallax" are reversed in only an image region(s), an interpolated image is generated for the image region or a region including the image region. As a result, while an interpolated image is generated in a region which is likely to appear to be unnatural, whereby high-quality stereoscopic display can be achieved, the proportion of an interpolated image to the entire image can be reduced, whereby a degradation in image quality due to an error in interpolation can be reduced.

A motion vector which has low reliability or a parallax which has low reliability may not be used to determine whether or not an interpolated frame is to be generated. For example, a block having a low reliable motion vector or parallax may be removed from a region in which the relationships in magnitude of a parallax and an "apparent parallax" are to be determined. In this case, for example, the vector detector 203 outputs a detected motion vector and information about the reliability of the motion vector, and the parallax detector 210 outputs a detected parallax and information about the reliability of the parallax. Thereafter, the output controller 204 does not use a motion vector whose reliability is lower than a predetermined threshold in determining whether or not to generate an interpolated frame, and does not use a parallax whose reliability is lower than a predetermined threshold in determining whether or not to generate an interpolated frame.

The reliability of a motion vector or a parallax may be obtained, for example, based on the detected SAD value. If the SAD value is greater than a predetermined reference value (the reliability is lower than a predetermined threshold), a correlation between frames for detection of a motion detection and a parallax is low, it is inferred that the reliability of the detection result is low. Note that the reliability may be calculated in other manners. For example, the reliability may be determined based on a characteristic of an input stereoscopic image. For example, for an image having a flat picture, an image having repetition of the same pattern, etc., it is difficult to detect a motion vector or a parallax, and therefore, it can be inferred that the reliability of the detection result is low.

Although, in the above embodiment, the phases of input image signals of only right-eye images are shifted by 0.5 frames to generate interpolated frames, interpolated frames may be generated for input image signals of both left-eye and right-eye images. For example, the phase of one of left and right images is advanced by 0.25 frames to generate an interpolated frame, and the phase of the other image may be delayed by 0.25 frames to generate an interpolated frame. In other words, the interpolation phases may be placed between the left and right images of an output stereoscopic image and may be different from each other by half the period of the stereoscopic image signal. Note that when the phases of both left and right images are shifted, for example, by ±0.25 frames, the symmetry of the left and right images can be more suitably maintained, and therefore, a horizontally balanced stereoscopic image can be displayed. Note that the control is more complicated than when the phases of only either of left and right images are shifted.

In this case, the image memory 202 needs to be able to store at least four frames, i.e., current left and right images and the immediately previous left and right images. The vector detector 203 performs motion vector detection on both left and right images at 120 Hz. Because interpolated frames are generated for both left and right images, the output controller 204 outputs each control signal at 120 Hz.

As a result, a stereoscopic image which provides a correct stereoscopic effect can be displayed, and an interpolated frame is generated at a phase relatively closer to a base image of an input image signal, whereby the influence of an incorrect motion vector can be reduced, and therefore, a degradation in image quality due to an error in interpolation can be reduced.

In the above embodiment, a stereoscopic image signal including 60-Hz left images and 60-Hz right images is input.

Alternatively, an input stereoscopic image signal may have other frame frequencies. The timing relationships of signals in FIGS. 3 and 7 are only for illustrative purposes. The process may be performed at timings different from those of FIGS. 3 and 7, depending on the capacities of the image memory 202 and the vector memory 205.

The image memory 202 and the vector memory 205 may be external memories instead of internal memories in the stereoscopic image processing device 2. In this embodiment, the stereoscopic image processing device 2 processes left and right images in a time division manner. Alternatively, separate stereoscopic image processing devices may be provided for left and right images, and process left and right images in a division manner.

Although, in the above embodiment, the stereoscopic image processing device has been mainly described, this embodiment is not limited to this. In another embodiment, the present disclosure may be implemented as the stereoscopic image display device 100 of FIG. 1. The stereoscopic image display device 100 includes the display unit 1 which receives an output image signal from the stereoscopic image processing device 2 and performs frame sequential display.

In another embodiment, the process of the stereoscopic image signal processing device may be implemented by software which is executed by a computation device, such as a CPU, a DSP, etc. In this case, each component of the functional configuration diagram of FIG. 1 is implemented by a step in a processing algorithm.

Various embodiments have been described above as example techniques of the present disclosure, in which the attached drawings and the detailed description are provided.

As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential.

Since the embodiments described above are intended to illustrate the techniques in the present disclosure, it is intended by the following claims to claim any and all modifications, substitutions, additions, and omissions that fall within the proper scope of the claims appropriately interpreted in accordance with the doctrine of equivalents and other applicable judicial doctrines.

According to the present disclosure, a stereoscopic image having higher quality can be displayed even if a motion is present in the image. Therefore, the present disclosure is useful, for example, for a television which displays stereoscopic moving images.

What is claimed is:

1. A stereoscopic image processing device for generating an output image signal for frame sequential display based on an input stereoscopic image signal, comprising:
   a parallax detector that detects a parallax between a left-eye image and a right-eye image of the stereoscopic image signal;
   a vector detector that detects an inter-frame motion vector in at least either of the left-eye and right-eye images of the stereoscopic image signal;
   an output controller that determines whether or not to generate an interpolated frame based on the parallax detected by the parallax detector and the motion vector detected by the vector detector, and outputs a control signal indicating a result of the determination;
   an output image generator that receives the control signal, and generates an interpolated frame having an interpolation phase using the motion vector for at least either of the left-eye and right-eye images of the stereoscopic image signal when the control signal indicates that an interpolated frame is to be generated; and
   an output unit that arranges frames of the left-eye and right-eye images of the stereoscopic image signal alternately in time, and replace a frame corresponding to the interpolation phase with the interpolated frame generated by the output image generator.

2. The stereoscopic image processing device of claim 1, wherein
   the output controller calculates, from the parallax and the motion vector, an apparent parallax which is a parallax actually perceived by a viewer who is affected by a motion of an object, and based on the apparent parallax, determines whether or not to generate an interpolated frame.

3. The stereoscopic image processing device of claim 2, wherein
   the parallax detector divides the left-eye and right-eye images into a plurality of regions and detects the parallax for each region,
   the vector detector detects the motion vector for each of the plurality of regions; and
   the output controller calculates, for each of the plurality of regions, the apparent parallax from the parallax and the motion vector in the region, and determines whether or not to generate an interpolated frame, based on comparison between the apparent parallaxes of the regions.

4. The stereoscopic image processing device of claim 3, wherein
   the output controller determines to generate an interpolated frame when a relationship in a magnitude of the parallax between a first region which is one of the plurality of regions and at least one second region located around the first region is different from a relationship in a magnitude of the apparent parallax between the first region and the at least one second region.

5. The stereoscopic image processing device of claim 1, wherein
   the output controller determines whether or not to generate an interpolated image, for each mage region of the interpolated frame, and
   in the interpolated frame, the output image generator generates the interpolated image in an image region for which the output controller determines to generate the interpolated image, and uses a base image in an image region for which the output controller determines not to generate the interpolated image.

6. The stereoscopic image processing device of claim 1, wherein
   the vector detector outputs a detected motion vector and information about a reliability of the motion vector, and
   the output controller does not use a motion vector whose reliability is lower than a predetermined threshold for determining whether or not to generate an interpolated frame.

7. The stereoscopic image processing device of claim 1, wherein
   the parallax detector outputs a detected parallax and information about a reliability of the parallax, and
   the output controller does not use a parallax whose reliability is lower than a predetermined threshold for determining whether or not to generate an interpolated frame.

8. The stereoscopic image processing device of claim 1, wherein
the output image generator generates the interpolated frame for at least either of the left-eye and right-eye images of the stereoscopic image signal, and sets the interpolation phase to a middle position between two successive frames.

9. The stereoscopic image processing device of claim 1, wherein
the output image generator generates an interpolated frame for both the left-eye and right-eye images of the stereoscopic image signal, where an interpolation phase of a left-eye image and an interpolation phase of a right-eye image are different from each other by half a period of the stereoscopic image signal.

10. A stereoscopic image display device comprising:
the stereoscopic image processing device of claim 1; and
a display that receives an output image signal from the stereoscopic image processing device and perform frame sequential display.

11. A stereoscopic image processing method for generating an output image signal for frame sequential display based on an input stereoscopic image signal, comprising the steps of:
detecting a parallax between a left-eye image and a right-eye image of the stereoscopic image signal;
detecting an inter-frame motion vector in at least either of the left-eye and right-eye images of the stereoscopic image signal;
determining whether or not to generate an interpolated frame based on the detected parallax and the detected motion vector;
generating an interpolated frame having an interpolation phase using the motion vector for at least either of the left-eye and right-eye images of the stereoscopic image signal when it is determined that an interpolated frame is to be generated; and
arranging frames of the left-eye and right-eye images of the stereoscopic image signal alternately in time, and replacing a frame corresponding to the interpolation phase with the generated interpolated frame.

\* \* \* \* \*